United States Patent Office 3,012,392
Patented Dec. 12, 1961

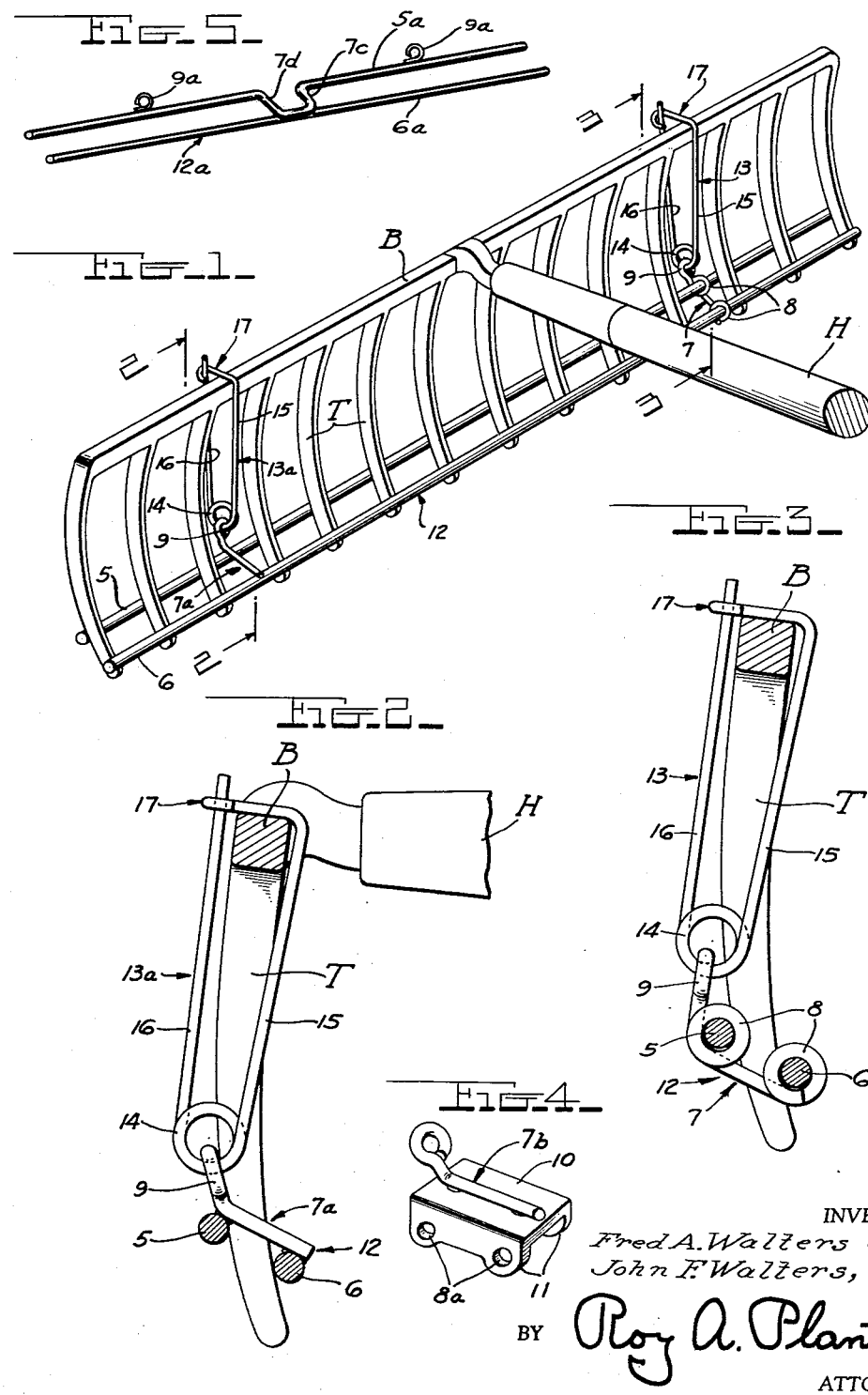

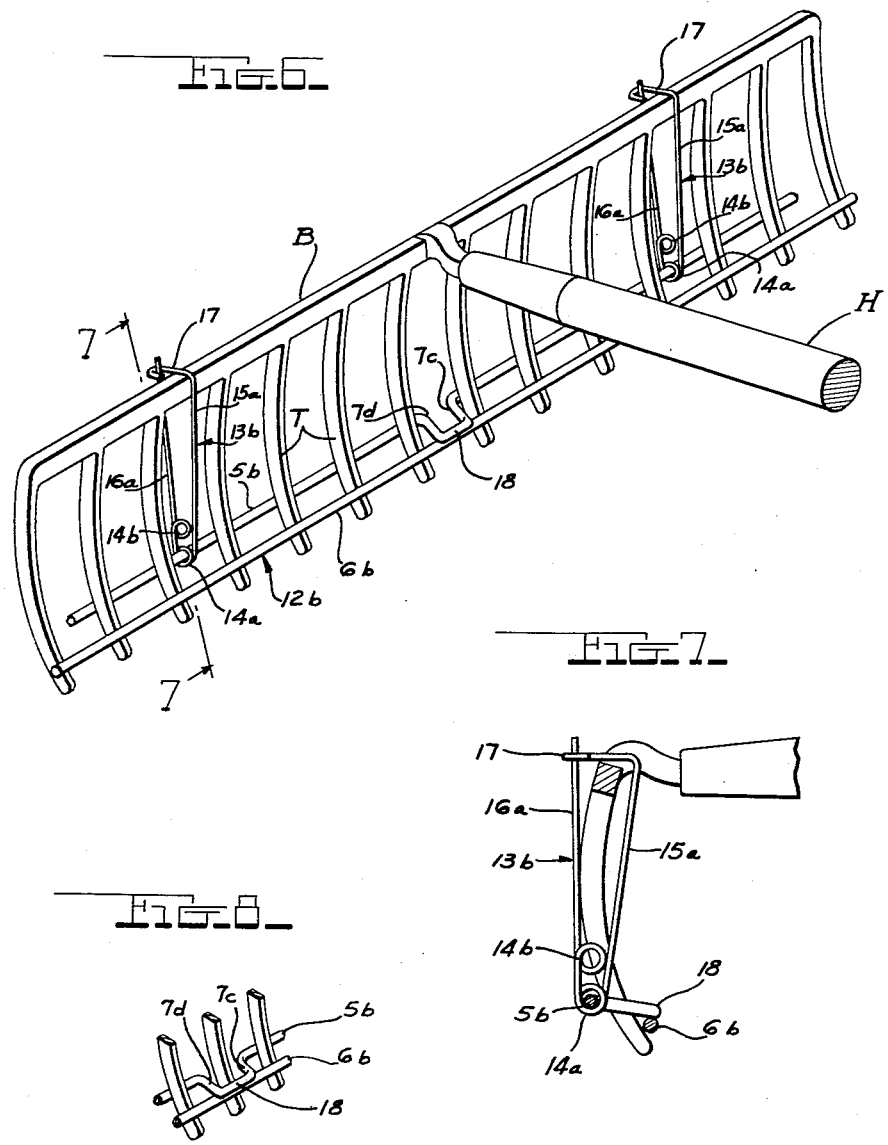

3,012,392
RAKE CLEANING DEVICE
John F. Walters, 28 Cliff St., and Frederick A. Walters, Penfield Township, both of Battle Creek, Mich.
Filed Sept. 14, 1959, Ser. No. 840,497
5 Claims. (Cl. 56—400.08)

The present invention relates broadly to cleaning devices, and more specifically to a new and improved device for preventing trash, grass, leaves and other rakings from collecting on and remaining between the teeth of a rake during use and requiring frequent hand cleaning.

This invention is a continuation-in-part of our copending patent application Ser. No. 826,686, filed July 13, 1959, now abandoned.

The device is adapted for use with a rake of the type having a handle, a transverse bar secured substantially at its center to the front end of said handle, and rigid teeth, either straight or curved, projecting downwardly from said transverse bar. Some cleaning devices for rakes of this type, have been devised in the past. However, for such reasons as expensive manufacture and consequent high price, non-adjustability and difficulty of attachment, liability of disarrangement upon or jumping off of the rake, heaviness interfering with rake operation, inefficiency, binding, et cetera, no such cleaner has heretofore possessed such potentialities as to induce commercial manufacture, marketing and purchase thereof, insofar as we are aware. Consequently no such device is available on the market and hand-cleaning of rakes must still be performed at frequent intervals during raking operations. It was a recognition of this problem and the lack of any commercial or wholly satisfactory solution to same which led to the conception and development of the present invention.

Accordingly among the objects of the present invention is the provision of a new and improved rake cleaning attachment free from such drawbacks as its predecessors and therefore standing a much better chance for profitable manufacture and sale, as well as entirely fulfilling all requirements of the purchaser and user.

Another object is to provide a rake cleaner which can be made of wire in highly simplified manner so as to provide a low cost item, light enough in weight to not interfere with its use and yet heavy enough to make the rake cleaning automatic and positive.

A further object is to provide a rake cleaner which is adapted to work equally well on standard long and short rigid tooth rakes, as well as rakes having a tooth directly in the center of the transverse bar of same while being equally useable on rakes where the center teeth are at opposite sides of such center.

Still further objects and advantages of the invention will appear as the description proceeds.

To the accomplishment of the foregoing and related ends, the invention, then, consists of the cleaning means hereinafter fully described and particularly pointed out in the claims, the annexed drawings and the following description setting forth in detail certain means for carrying out the invention, such disclosed means illustrating, however, but several of the various ways in which the principle of the invention may be used.

In the annexed drawings:

FIGURE 1 is a perspective view showing one form of the invention applied to a rake.

FIGURES 2 and 3 are enlarged vertical sectional views as taken on the lines 2—2 and 3—3 of FIGURE 1, looking in the direction of the arrows.

FIGURE 4 is a detail perspective view showing a slight modification in construction of the adjustable member of FIGURES 1 and 3.

FIGURE 5 is a detail perspective view showing a simplified form of the elongated frame member of FIGURE 1.

FIGURE 6 is a perspective view, similar to FIGURE 1, showing a generally preferred form of the present invention applied to a rake having its center rigid teeth substantially equally spaced on opposite sides of the center of the transverse bar.

FIGURE 7 is a vertical sectional view as taken on the line 7—7 of FIGURE 6, looking in the direction of the arrows.

FIGURE 8 is a fragmentary detail perspective view showing how the central portion of the rake cleaner of FIGURES 5 and 6 will straddle a central tooth on the transverse bar of a rigid tooth rake.

While preferences have been disclosed in the drawings and the varying detail forms will be rather specifically described, attention is invited to the possibility of making further variations. Also, for illustration, the invention has been shown attached to a rake having the customary handle H, transverse bar B secured to the front end of said handle H, and rigid teeth T projecting downwardly from said bar B. However, it is to be understood that while the invention may be sold with a rake, more commonly it is simply an attachment intended primarily to be sold independently of the rake, to users already having a rake.

The attachment includes, as shown in FIGURE 1, a front metal rod 5 for disposition in front of the teeth T, and a rear metal rod 6 for disposition behind said teeth. Right and left metal connecting members 7 and 7a connect the two rods 5 and 6 and space them apart a moderate distance which is considerably greater than the maximum front to rear dimensions of the teeth T while permitting said rods to slide simultaneously up and down the front and rear faces of said teeth T. The connection member 7a is welded to the rods 5 and 6, whereas the member 7 has eyes 8 slidably receiving said rods. This permits adjustment of the member 7 with respect to the member 7a and allows both of said members to pass between teeth of the rake, regardless of the width and spacing of the latter. The rods 5 and 6 are, of course, of the maximum length which may be required for cleaning the particular rake involved.

One end of each of the connecting members 7 and 7a, FIGURE 1, has an eye 9 at its front end; and both of said members 7 and 7a are preferably formed from wire as shown in FIGURES 1 to 3 inclusive, with the wire bent to form the necessary eye or eyes. However, instead of an all-wire construction for the member 7, the construction shown in FIGURE 4 may be employed. In this view, a duplicate 7b of the member 7a is welded to a downwardly flanged sheetmetal plate 10 and the side flanges 11 of this plate have eyes 8a to slidably receive the rods 5 and 6. In either instance, the two rods 5 and 6 and the connecting members jointly form an elongated frame 12 through which the lower ends of the rigid teeth T project.

Right and left suspenders 13 and 13a, FIGURE 1, are provided for the frame 12. Each of these suspenders, as shown, is formed from a length of spring wire and comprises an eye-forming coil 14, two arms 15 and 16 projecting upwardly from the ends of said coil 14 and a hook 17 on the upper end of the arm 15 to be engaged by the upper end of the arm 16. The arms 15 and 16 are intended for disposition, respectively, behind and in front of the transverse bar B of the rake, with free sliding engagement on said bar, and the hook 17 is intended to pass over said bar, thus suspending the suspender 13 or 13a and connecting it with the rake.

The coil 14, FIGURE 1, of the suspender 13 loosely engages the eye 9 of the connecting member 7, and the coil 14 of the suspender 13a similarly engages the eye 9 of the connecting member 7a. Thus, the frame 12 is pivotally and flexibly connected loosely with the suspenders 13 and 13a at off-center points with respect to the longitudinal center line of the frame 12. Consequently this frame may tilt by gravity to such a position as to assure contact of the rod 5 with the front edges of the teeth T, and contact of the rod 6 with the rear edges of said teeth, as best seen in FIGURES 2 and 3.

Contact of the rods 5 and 6 with the teeth T assures thorough cleaning of said teeth T each time the rake is lifted since frame 12 descends by gravity after having been pushed up by material gathered by said teeth during normal raking operation. Each time the rake is pulled in raking operation, the gathered material lifts the frame 12 and the suspenders 13 and 13a. Each time the rake is lifted from the ground, the frame 12 and suspenders 13 and 13a descend by gravity and the rods 5 and 6 then slide downward on the rake teeth T and thus push all gathered material from said teeth.

A highly simplified form of tiltable frame 12a, is shown in FIGURE 5 and is adapted to be substituted for frame 12 of FIGURE 1. The frame 12a has a front rod 5a and a rear rod 6a connected together substantially midlength of same by right and left connectors 7c and 7d which are spaced apart enough to freely receive a rigid rake tooth of an old style rake having a center tooth at the point of mounting the rake handle on the bar B, FIGURE 8 showing the lower end of such center tooth with a fragmentary portion of the rake cleaner of the present invention mounted thereon, and yet not so widely spaced as to interfere with mounting the assembly on a rake having the handle H connected to bar B substantially centrally between the two center teeth of the rake as shown in FIGURE 6. These connectors 7c and 7d may be of any suitable form, but preferably they are portions of a substantially central kink in rod 5a, or 5b, FIGURES 5 and 6, with the top or cross-bar of the kink being spot welded or brazed to rear rod 6a or 6b. Rod 5a, FIGURE 5, also is preferably provided with eyes 9a or short connectors near each end of same which are spot welded or brazed in position to support right hand and left hand suitable suspenders usable as typically shown in FIGURE 1.

A preferred and still further simplified form of the invention is shown in FIGURES 6, 7 and 8. Here the frame 12b consists of a rear metal rod 6b, and a front metal rod 5b having a central kink which has right and left metal connecting members 7c and 7d with a front connector 18 joining same and which is welded or otherwise rigidly connected substantially at the midpoint of the parallel rear metal rod 6b. These right and left metal connecting members 7c and 7d are spaced apart far enough to freely straddle a central rake tooth, or freely fit between two centrally located teeth of a rake of that type, the same as set forth in connection with the description of the construction shown in FIGURE 5. This construction is illustrated in FIGURES 6 and 8.

Rakes of the rigid tine form illustrated have been made with long tines as well as short tines and to meet this situation and produce a universally adapted rake cleaner, special suspenders 13b, FIGURE 7, have been devised for use in the simplified combination shown in FIGURE 6. This suspender, of which there are two for each complete device, has side members 15a and 16a, with the upper end of same supported on a hook 17 as previously set forth. Said side members 15a and 16a are joined at their lower ends with a coil 14a through which rod 5b would be threaded where the rake had long teeth as shown in FIGURE 6. On the other hand, to meet the situation where the rake has shorter teeth, due either to initial manufacture or long wear, one of the side members of suspender 13b is provided with a second coil 14b which is close to coil 14a but spaced toward hook 17 of the suspender. This allows front rod 5b to be threaded through this second coil 14b to thus correspondingly raise frame 12b, and when assembled on a correspondingly shorter toothed rake the cleaner will operate satisfactorily on same.

From the foregoing, it will be seen that several closely related forms of a simple, inexpensive, easily attached, efficient and durable rake cleaner have been provided. Attention, however, is again invited to the possibility of making further variations within the spirit and scope of the invention as claimed. Also, "rods" is not to be considered as necessarily implying circular cross section or even steel, since other cross sections can be used as well as other material such as brass, bronze, nickel, and even some forms of plastic. Also the directional terms such as "front," "rear," "behind," "downwardly," "right," "left," "up," "down," et cetera have been used to facilitate describing the invention in the position shown in the drawings and the normal way in which a rake would be used in raking lawns or gardening, and are not to be considered as limiting the invention.

Other modes of applying the principle of our invention may be employed instead of those explained, change being made as regards the cleaning apparatus herein disclosed, provided the means stated by any of the following claims or the equivalent of such stated means be employed:

We therefore particularly point out and distinctly claim as our invention:

1. In a cleaner for toothed implements, such as rakes, which have a handle-carried transverse bar and substantially uniform length teeth projecting downwardly from said transverse bar; a front tooth-cleaning rod means for disposition at the front side of said teeth, a rear tooth-cleaning rod means for disposition at the rear side of said teeth, means connecting said front and rear rod means and spacing them apart, substantially their full length, a distance a little greater than the front-to-rear dimensions of said teeth, said rod means and connecting means coacting in forming a unitary frame, and means connecting said frame adjacent opposite ends of same to said transverse bar in manner suspending the former from the latter while permitting ascent and descent of said frame on said teeth projecting from said transverse bar, said frame being flexibly joined to said frame connecting means at off-center points on said frame with respect to the longitudinal center line of same and on the same side of said frame, whereby said frame will tilt by gravity to position one of said rod means lower than the other of said rod means, thereby causing said front and rear rod means to simultaneously contact and slide lengthwise of said teeth respectively on the front and rear edges of same under normal conditions of use, and wherein said means connecting said frame to said transverse bar comprises right and left suspenders for crosswise slidable engagement with said transverse bar; and in which said frame is pivotally connected loosely to the lower end portion of said suspenders, and further wherein said means connecting said front and rear tooth cleaning rod means is in the form of a pair of substantially centrally located but spaced apart cross tie means rigidly joined to both of said front and rear tooth cleaning rod means and holding same in substantially parallel position relative to each other.

2. In a cleaner for toothed implements, such as rakes, which have a handle-carried transverse bar and substantially uniform length teeth projecting downwardly from said transverse bar; a front tooth-cleaning rod means for disposition at the front side of said teeth, a rear tooth-cleaning rod means for disposition at the rear side of said teeth, means connecting said front and rear rod means and spacing them apart, substantially their full length, a distance a little greater than the front-to-rear dimenions of said teeth, said rod means and connecting means coacting in forming a unitary frame, and means connecting said frame adjacent opposite ends of same to said transverse bar in manner suspending the former from the latter while permitting ascent and descent of said frame on said teeth projecting down from said transverse bar, said frame being flexibly joined to said frame connecting means at off-center points on said frame with respect to the longitudinal center line of same and on the same side of said frame, whereby said frame will tilt by gravity to position one of said rod means lower than the other of said rod means, thereby causing said front and rear rod means to simultaneously contact and slide lengthwise of said teeth respectively on the front and rear edges of same under normal conditions of use, and wherein said means for suspending said frame from said transverse bar and for permitting ascent and descent of said frame on said teeth comprises relatively flat plane right and left suspenders for crosswise slidable engagement with said transverse bar, each of said suspenders having in the plane of said suspenders, a looped bottom and an adjacent second loop above same; and in which said frame is pivotally connected loosely in the corresponding loop of each of said suspenders with said second loops being used where the implement teeth are short and the frame is to be held in position just short of coming off from said teeth.

3. A structure as set forth in claim 2, in which said means connecting said front and rear tooth cleaning rod means consists of a pair of substantially centrally located but spaced apart cross tie means rigidly joined to both of said front and rear tooth cleaning rod means and holding same in spaced apart substantially parallel position relative to each other.

4. A structure as set forth in claim 2, in which said front and rear tooth cleaning rod means is in the form of one substantially straight rod and a second substantially straight rod having a substantially central kink in same with the side members of said kink being spaced apart a distance which will slidably receive a rake tooth between them and yet slidably fit between two rake teeth, the two side members of said kink being joined by a short portion extending substantially parallel to the main portion of said rod, said latter short portion being rigidly joined to said one rod with the two rods thus comprising said front and rear tooth cleaning means; wherein one of said rods will have one end portion of same threaded through a loop of one of said suspenders and the other end of said rod will be threaded through a like loop of the second of said suspenders with said suspenders slidably fitting said transverse bar near opposite ends of same.

5. In a cleaner for a rake having a handle-carried transverse bar and rigid teeth of substantially uniform length projecting downwardly from one side of said transverse bar; two suspenders mounted on said transverse bar for crosswise slidable engagement therewith, each of said suspenders comprising a looped bottom and two arms projecting upwardly from opposite sides of said looped bottom and substantially in the plane of same for disposition at the front and rear sides of said transverse bar respectively, each of said suspenders also having a second loop in one of said arms adjacent said first loop and substantially in the same plane, means on the upper end of one of said arms which engages and connects same with the corresponding end of the other of said arms, and a tooth-cleaning member pivotally mounted on a corresponding looped portion of each of said suspenders slidably mounted on said cross-bar.

References Cited in the file of this patent
UNITED STATES PATENTS

| | | |
|---|---|---|
| 667,428 | Doane | Feb. 5, 1901 |
| 1,981,488 | Wikander et al. | Nov. 20, 1934 |
| 2,183,278 | Kelly | Dec. 12, 1939 |
| 2,471,239 | Richards | May 24, 1949 |
| 2,539,590 | Perzynski | Jan. 30, 1951 |
| 2,544,436 | Steapleton | Mar. 6, 1951 |
| 2,572,247 | Conway | Oct. 23, 1951 |